United States Patent
Yu et al.

(10) Patent No.: US 11,159,232 B2
(45) Date of Patent: Oct. 26, 2021

(54) METHOD OF SITE SELECTION FOR MONITORING STATION, AND DEVICE FOR SITE SELECTION FOR MONITORING STATION

(71) Applicant: Accelink Technologies Co., Ltd., Wuhan (CN)

(72) Inventors: Lei Yu, Wuhan (CN); Xingyun Chen, Wuhan (CN); Yizhi Yang, Wuhan (CN); Ming Yang, Wuhan (CN); Shuihan Yi, Wuhan (CN); Zhizhu Zhou, Wuhan (CN)

(73) Assignee: Accelink Technologies Co., Ltd.

( * ) Notice: Subject to any disclaimer, the term of this patent is extended or adjusted under 35 U.S.C. 154(b) by 0 days.

(21) Appl. No.: 15/734,894

(22) PCT Filed: Dec. 25, 2018

(86) PCT No.: PCT/CN2018/123426
§ 371 (c)(1),
(2) Date: Dec. 3, 2020

(87) PCT Pub. No.: WO2019/242268
PCT Pub. Date: Dec. 26, 2019

(65) Prior Publication Data
US 2021/0226699 A1    Jul. 22, 2021

(30) Foreign Application Priority Data

Jun. 22, 2018   (CN) .......................... 201810650738.0

(51) Int. Cl.
*H04B 10/079*   (2013.01)
*H04Q 11/00*    (2006.01)
(Continued)

(52) U.S. Cl.
CPC ....... *H04B 10/0791* (2013.01); *H04B 10/071* (2013.01); *H04L 45/123* (2013.01); *H04Q 11/0005* (2013.01)

(58) Field of Classification Search
CPC . H04B 10/0791; H04B 10/071; H04L 45/123; H04Q 11/0005
(Continued)

(56) References Cited

U.S. PATENT DOCUMENTS

| 6,005,694 A | * | 12/1999 | Liu ...................... H04B 10/071 398/20 |
| 10,536,389 B1 | * | 1/2020 | Chen .................... G06Q 10/067 |

(Continued)

FOREIGN PATENT DOCUMENTS

| CN | 102946273 A | 2/2013 |
| CN | 103166809 A | 6/2013 |

(Continued)

OTHER PUBLICATIONS

Chinese Search Report for Application No. 201810650738.0 dated Aug. 24, 2020, pp. 1-2.

(Continued)

*Primary Examiner* — Dalzid E Singh
(74) *Attorney, Agent, or Firm* — Lerner, David, Littenberg, Krumholz & Mentlik, LLP

(57) ABSTRACT

The present invention relates to technical field of communications and provides a method and a device for site selection for a monitoring station. The method comprises acquiring a site list comprising multiple relay stations and a connection relationship of optical cables among the relay stations; sequentially setting each relay station to be a starting site, and traversing the relay stations in the site list according to a preset coverage range from the starting site, and determining a set of uncovered relay stations corre- (Continued)

sponding to each starting site; according to a preset intersection base, traversing the set of relay stations that cannot be covered corresponding to each starting site to get an intersection, and determining one or more relay stations corresponding to a set of whose intersection result is empty as a target monitoring station. The method improves efficiency and accuracy of site selections and has wide applicability.

10 Claims, 4 Drawing Sheets

(51) Int. Cl.
  *H04L 12/721*   (2013.01)
  *H04B 10/071*   (2013.01)
(58) Field of Classification Search
  USPC .......................................................... 398/13
  See application file for complete search history.

(56) References Cited

U.S. PATENT DOCUMENTS

| | | | | |
|---|---|---|---|---|
| 2004/0015309 | A1* | 1/2004 | Swisher | ................. H04L 41/22 |
| | | | | 702/79 |
| 2015/0181317 | A1* | 6/2015 | Yin | ....................... H04L 49/356 |
| | | | | 398/45 |
| 2016/0173194 | A1* | 6/2016 | Zhou | .................... H04B 10/071 |
| | | | | 398/21 |
| 2017/0244475 | A1 | 8/2017 | Malach | |
| 2020/0336809 | A1* | 10/2020 | Zhang | .................... H04L 45/28 |

FOREIGN PATENT DOCUMENTS

| | | |
|---|---|---|
| CN | 103384406 A | 11/2013 |
| CN | 204046607 U | 12/2014 |
| CN | 104796193 A | 7/2015 |
| CN | 105978642 A | 9/2016 |
| CN | 106507377 A | 3/2017 |
| CN | 206195782 U | 5/2017 |
| CN | 108923848 A | 11/2018 |
| JP | 2007124138 A | 5/2007 |
| WO | 2009158382 A1 | 12/2009 |

OTHER PUBLICATIONS

International Search Report for Application No. PCT/CN2018/123426, dated Mar. 6, 2019, pp. 1-2.

\* cited by examiner

| No. | Name of Optical cable segment | Name of site | Name of site | Fiber attenuation(dB) |
|---|---|---|---|---|
| 1 | A-B | A | B | 20 |
| 2 | A-M | A | M | 20 |
| 3 | B-H | B | H | 15 |
| 4 | B-N | B | N | 15 |
| 5 | B-C | B | C | 15 |
| 6 | C-I | C | I | 15 |
| 7 | C-O | C | O | 15 |
| 8 | C-D | C | D | 10 |
| 9 | D-J | D | J | 15 |
| 10 | D-E | D | E | 25 |
| 11 | N-Q | N | Q | 15 |
| 12 | N-O | N | O | 20 |
| 13 | O-P | O | P | 25 |
| 14 | O-R | O | R | 15 |
| 15 | E-F | E | F | 10 |
| 16 | F-G | F | G | 20 |

FIG. 4b

| Attenuation (dB) Relay station \ Starting site | A | B | C | D | E | F | N | O |
|---|---|---|---|---|---|---|---|---|
| A | 0 | 20 | 35 | 45 | 70 | 80 | 35 | 50 |
| B | 20 | 0 | 15 | 25 | 50 | 60 | 15 | 30 |
| C | 35 | 15 | 0 | 10 | 35 | 45 | 30 | 15 |
| D | 45 | 25 | 10 | 0 | 25 | 35 | 40 | 25 |
| E | 70 | 50 | 35 | 25 | 0 | 10 | 65 | 50 |
| F | 80 | 60 | 45 | 35 | 10 | 0 | 75 | 60 |
| G | 100 | 80 | 65 | 55 | 35 | 20 | 95 | 20 |
| H | 35 | 15 | 30 | 40 | 65 | 75 | 30 | 45 |
| I | 50 | 30 | 15 | 25 | 50 | 60 | 45 | 30 |
| J | 60 | 40 | 25 | 15 | 40 | 50 | 55 | 40 |
| M | 20 | 40 | 55 | 65 | 90 | 100 | 55 | 70 |
| N | 35 | 15 | 30 | 40 | 65 | 75 | 0 | 20 |
| O | 50 | 30 | 15 | 25 | 50 | 60 | 20 | 0 |
| P | 75 | 55 | 40 | 50 | 75 | 85 | 45 | 25 |
| Q | 50 | 30 | 45 | 55 | 80 | 90 | 15 | 35 |
| R | 65 | 45 | 30 | 40 | 65 | 75 | 35 | 15 |

METHOD OF SITE SELECTION FOR MONITORING STATION, AND DEVICE FOR SITE SELECTION FOR MONITORING STATION

CROSS-REFERENCE TO RELATED APPLICATIONS

The present application is a national phase entry under 35 U.S.C § 371 of International Application No. PCT/CN2018/123426 filed Dec. 25, 2018, which claims priority from Chinese Application No. 201810650738.0 filed Jun. 22, 2018, all of which are hereby incorporated herein by reference.

TECHNICAL FIELD OF THE DISCLOSURE

The present disclosure relates to the field of communications, and in particular, to a method of site selection for a monitoring station, and a device for site selection for a monitoring station.

BACKGROUND

With the development of communication network, an optical fiber network becomes more and more complex, and optical fiber network failures also increase due to the influence of engineering construction and natural disasters. A cable monitoring system can monitor an optical fiber in real time, automatically search fault points and hidden troubles of an optical cable, shorten the failure duration of an optical cable, improve the maintenance efficiency of a transmission network, and meanwhile, reduce the line maintenance cost.

When a scheme of an optical cable monitoring system is designed, a monitoring station is used as a core function site of the optical cable monitoring system, therefore, it is necessary to reasonably design the distribution of monitoring stations, and the reasonable site selection of monitoring stations may cover as many optical cable lines as possible with the least monitoring stations, which may optimize the layout and reduce the investment.

Currently, the site selection of monitoring stations is performed through a manual manner. The designer decides to set a portion of sites as monitoring stations and design the range of optical cables monitored by the monitoring stations according to a site distribution and a connection condition of optical cables. With the increasing complexity of optical fiber network, relay stations are also increasing. For hundreds or even thousands of relay stations, it is difficult to manually select the optimal monitoring station.

Therefore, overcoming the defects existing in the prior arts is a problem to be urgently solved in the present technical field.

SUMMARY

The technical problem to be solved in embodiments of the present disclosure is as follows: how to select the optimal monitoring station which is difficult to manually design the reasonable distribution of monitoring stations, for hundreds or even thousands of relay stations, since the site selection of a monitoring station, as the core function site of an optical cable monitoring system, directly affects the range of optical cables that can be monitored by the optical cable monitoring system and relay stations also increase as the complexity of the optical fiber network increases. Therefore, it is necessary to reasonably site the monitoring station to realize covering as many optical cable lines as possible with the least resource, thus improving the efficiency of failure analysis.

Embodiments of the present disclosure adopt following technical solutions.

In a first aspect, the present disclosure provides a method of site selection for a monitoring station, comprising:

acquiring a site list including a plurality of relay stations and a connection relationship of optical cables between the relay stations;

sequentially setting each relay station as a starting site, and traversing the relay stations in the site list starting from the starting site according to a preset coverage range, then determining a set of uncovered relay stations corresponding to each of the starting sites;

traversing the set of uncovered relay stations corresponding to each of the starting sites according to a preset intersection cardinality to get an intersection set, and determining one or more relay stations corresponding to a set whose intersection result is an empty set as a target monitoring station.

Preferably, after the acquiring a site list including a plurality of relay stations and a connection relationship of optical cables between the relay stations, the method further comprises: acquiring a number of optical cables of each relay station, wherein the number of optical cables is a number of optical cables directly established a connection between one of the relay stations and other relay stations in the station list;

acquiring a set of relay stations with the number of optical cables being not less than 2;

the sequentially setting each relay station as a starting site, and traversing the relay stations in the site list starting from the starting site according to a preset coverage range, then determining a set of uncovered relay stations corresponding to each of the starting sites, comprises:

sequentially setting each relay station in the relay station set with the number of optical cables being not less than 2 as a starting site, and traversing the relay stations in the site list starting from the starting site according to a preset coverage range, then determining a set of uncovered relay stations corresponding to each of the starting sites.

Preferably, the sequentially setting each relay station as a starting site, and traversing the relay stations in the site list starting from the starting site according to a preset coverage range, then determining a set of uncovered relay stations corresponding to each of the starting sites comprises:

sequentially setting each relay station as a starting site;

calculating shortest path length from the starting site to the relay stations in the station list through a shortest path algorithm;

acquiring a relay station corresponding to the shortest path length being greater than the preset coverage range, thereby integrating and obtaining a set of uncovered relay stations corresponding to each of the starting sites.

Preferably, the preset coverage range is a dynamic range of an optical time domain reflectometer OTDR; and optical fiber attenuation between the relay stations represents path length between the relay stations;

the acquiring a relay station corresponding to the shortest path length being greater than the preset coverage range, thereby integrating and obtaining a set of uncovered relay stations corresponding to each of the starting sites comprises:

acquiring a relay station corresponding to the shortest path length being greater than the dynamic range of the OTDR, thereby integrating and obtaining a set of uncovered relay stations corresponding to each of the starting sites.

Preferably, the shortest path algorithm comprises any one of Dijkstra algorithm, Bellman-Ford algorithm, Floyd algorithm, and SPFA algorithm.

Preferably, the dynamic range of the OTDR is a maximum attenuation value of backscattering curve which can be tested by the optical time domain reflectometer OTDR, and a range of the maximum attenuation value is 30~45 dB.

Preferably, the intersection cardinality is a number of sets in every time of intersection; the traversing the set of uncovered relay stations corresponding to each of the starting sites according to a preset intersection cardinality to get an intersection set, and determining one or more relay stations corresponding to a set whose intersection result is an empty set as a target monitoring station, comprises:

traversing the set of uncovered relay stations corresponding to each of the starting sites according to a preset intersection cardinality to get an intersection set;

determining whether there is an empty set in intersection results in this traversing and intersecting process;

if there is no empty set, resetting the intersection cardinality in an incremental manner, and traversing a set of uncovered relay stations corresponding to each of the starting sites according to the reset intersection cardinality to get an intersection set, and determining whether there is an empty set in the intersection results in this traversing and intersecting process.

Preferably, the method of site selection further comprises: if there is an empty set, stopping traversing and intersecting, and determining one or more relay stations corresponding to a set whose intersection result is an empty set as a target monitoring station.

Preferably, the preset intersection cardinality is 1; the traversing a set of uncovered relay stations corresponding to each of the starting sites according to a preset intersection cardinality to get an intersection set, and determining one or more relay stations corresponding to a set whose intersection result is an empty set as a target monitoring station comprises:

sequentially intersecting a set of uncovered relay stations corresponding to each starting site between each other;

determining whether there is an empty set in the set of uncovered relay stations corresponding to the starting site;

if a set of uncovered relay stations corresponding to the starting site is an empty set, determining a relay station corresponding to said set of relay stations as a target monitoring station.

In a second aspect, the present disclosure further provides a device for site selection for a monitoring station, comprising: at least one processor; and a memory communicatively connected with the at least one processor; wherein the memory stores instructions that are executable by the at least one processor, and the instructions are set by a program to execute the method of site selection for a monitoring station as described in the first aspect.

In a third aspect, the present disclosure further provides a non-volatile computer-readable storage medium, which stores computer-executable instructions being executed by one or more processors to complete the method of site selection for a monitoring station as described in the first aspect.

Compared with the prior arts, the embodiments of the present disclosure have following advantages: the present disclosure adopts a traversal manner to determine a set of uncovered relay stations corresponding to each relay station, and sequentially traverses the aforementioned sets to get an intersection set, and when an empty set exists in the intersection results, it can be determined that there is no same relay station in the aforementioned one or more sets, such that it can be determined that the mutual cooperation of the relay stations corresponding to the set whose intersection result as mentioned above is an empty set can cover all relay stations in the site list, then the relay station corresponding to the set whose intersection result is an empty set can be set as a target monitoring station, such that the optical cable monitoring system can easily monitor all of the relay stations in the site list, improve the efficiency and accuracy of site selection for a monitoring station and has wide applicability, which in turn shortens the failure duration of the fiber optic cable, improves the maintenance efficiency of the transmission network, and meanwhile, reduces the line maintenance cost.

BRIEF DESCRIPTION OF THE DRAWINGS

For a more clear description of the embodiments of the present disclosure or the technical solutions in the prior arts, drawings to be used in the description of the embodiments or the prior arts will be briefly introduced below, and obviously, the drawings are only for some embodiments of the present disclosure, and those with ordinary skills in the art may obtain other drawings based on these drawings without paying creative labor.

FIG. 4b is a schematic diagram of connection relationships of optical cables and relationships of optical cable attenuation between the relay stations in FIG. 4a.

DETAILED DESCRIPTION

Figure 1:
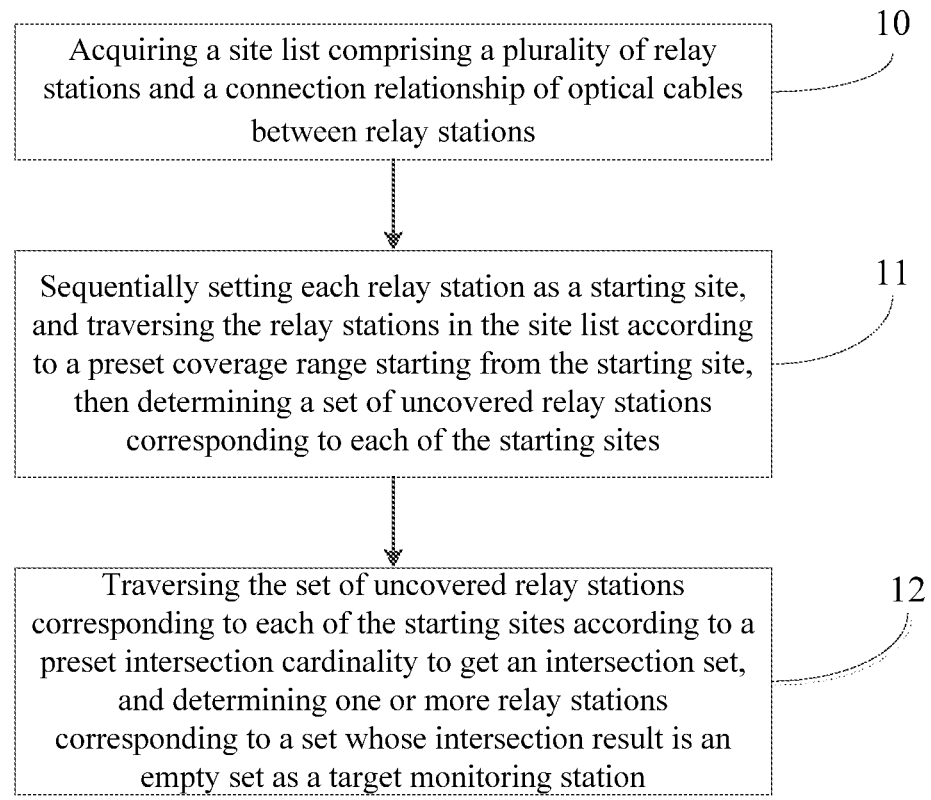
FIG. 1 is a flow schematic diagram of a method of site selection for a monitoring station provided by an embodiment of the present disclosure.

In order to make the objects, technical solutions and advantages of the present disclosure more obvious, the present disclosure is further described in detail below with reference to the accompanying drawings and embodiments. It shall be understood that the specific embodiments described herein are only for explaining the present disclosure but not for limiting the present disclosure.

Embodiment 1

Embodiment 1 of the present disclosure provides a method for siting a monitoring station, which is suitable for an optical fiber network with various network connection relationships, in particular for scenes where the connection relationships of an optical fiber network are complex and there are many relay stations. The method of site selection for a monitoring station of the present embodiment 1 can quickly and effectively select the optimal monitoring station from a plurality of relay stations, and improve the efficiency of the site selection. The method of site selection for a monitoring station comprises following steps:

Step 10: acquiring a site list including a plurality of relay stations and connection relationships of optical cables between the relay stations.

In the present embodiment, when performing the site selection for a monitoring station, it is necessary to firstly acquire an actual optical cables distribution map, then select a suitable relay station as the monitoring station according to the optical cable distribution map. In a specific application scene, when building a communication network for a certain range or place, an actual optical cable network structure is integrated into a network topology diagram or chart as a data source. In the present embodiment, a site list including a plurality of relay stations and connection relationships of optical cables between the relay stations can be obtained by analyzing the aforementioned data source.

Specifically, it is necessary to acquire a site list including a plurality of relay stations in a certain range or a certain place and connection relationships of optical cables between the relay stations, wherein in the same optical cable distribution map, site names of the relay stations in the site list are unique, so as to identify and distinguish different relay stations. Meanwhile, the optical cable connection relationships between different relay stations and the attenuation between different relay stations are obtained. In an actual scene, the attenuation of an optical cable has a certain relationship with the actual path length of the optical cable, and the attenuation of the optical cable can be used to indirectly reflect the actual path length of the optical cable.

Step 11: sequentially setting each relay station as a starting site, and traversing relay stations in the site list starting from the starting site according to a preset coverage range, then determining a set of uncovered relay stations corresponding to each of the starting sites.

The preset coverage range is determined by a test dynamic range of a corresponding optical cable tester, that is to say, it is determined by maximum test capability of the tester. In an actual application scene, an optical time domain reflectometer (OTDR) can be used to measure the optical cable between the relay stations, such that a failure is located. The OTDR is a precise photoelectric integrated instrument using Rayleigh scattering and backscattering generated by Fresnel reflection when light is transmitted in an optical fiber. The OTDR is widely used in the maintenance and construction of optical cable line, and can measure the length of optical fiber, transmission attenuation, joint attenuation and failure location of optical fiber, and the like.

In the present embodiment, the preset coverage range is set according to the dynamic range of the OTDR. The dynamic range of the OTDR is a maximum attenuation value of a backscattering curve which can be tested by the OTDR, and at present, a range of the maximum attenuation value of the OTDR on the market is 30~45 dB, i.e. the dynamic range of the OTDR is between 30 dB and 45 dB, and can be 30 dB or 40 dB or 45 dB. The greater the dynamic range of the OTDR is, the higher the corresponding cost of the OTDR tester is. In an actual application scene, the corresponding OTDR can be selected according to the actual situation, and then the coverage range is set.

In the present embodiment, every relay station in the site list is sequentially set as a starting site, and the relay stations in the site list are traversed from the starting site according to a preset coverage range, then a set of uncovered relay stations corresponding to every starting site is determined. When the optical fiber network is relatively complex, different connection paths may exist between different relay stations and the optical cable attenuation of different connection paths is different. In order to improve the accuracy of the determination, in the present embodiment, the shortest path algorithm is used to calculate the shortest path length between different relay stations, and the shortest path length is compared with the preset coverage range, further a set of uncovered relay stations corresponding to each starting site is determined. The specific method can refer to FIG. 2, and specifically comprises following steps:

Step 111: sequentially setting every relay station as a starting site.

Step 112: calculating the shortest path length from the starting site to the relay station in the station list through a shortest path algorithm.

In the present embodiment, the shortest path length from the starting site to the relay station in the station list is calculated through a shortest path algorithm, wherein the optical fiber attenuation between the relay stations represents the path length between the relay stations. In the present embodiment, the optical cable data transmission between different relay stations can be bidirectional.

The shortest path algorithm includes any one of Dijkstra algorithm, Bellman-Ford algorithm, Floyd algorithm, and SPFA algorithm, and the corresponding algorithm can be selected according to the actual optical cable distribution map.

Step 113: acquiring a relay station corresponding to the shortest path length being greater than the preset coverage range, thereby integrating and obtaining a set of uncovered relay stations corresponding to each of the starting sites.

Since the preset coverage range is determined by the tester, when the shortest path from the starting site to a certain relay station is greater than the preset coverage range, the tester cannot cover the relay station if starting from the starting site, i.e. the tester cannot completely test all the optical cables between the starting site and the relay station, and thus cannot determine a fault point. Therefore, when the shortest path length between the starting site and other relay station is greater than the preset coverage range, the starting site cannot cover the corresponding relay station, and the relay station corresponding to the shortest path length being greater than the preset coverage range is integrated, thus a set of uncovered relay stations corresponding to each starting site is obtained.

Specifically, when the OTDR is selected for testing, the preset coverage range is the dynamic range of the OTDR, and a relay station corresponding to the shortest path length being greater than the dynamic range of the OTDR is acquired, then a set of uncovered relay stations corresponding to each of the starting sites is integrated and acquired.

In a preferred embodiment, in order to improve the efficiency of site selection and save the ability of processing and calculation, a set of relay stations with optical cable directions being not less than 2 can be firstly screened out, and the sets of relay stations with optical cable directions being not less than 2 are traversed to get intersection sets and then to determine a set of uncovered relay stations corresponding to every starting site.

Specifically, a number of optical cables of every relay station is acquired, wherein the number of optical cables is a number of optical cables directly established a connection between a relay station and other relay stations in the station list, and acquiring a set of relay stations with the number of optical cables being not less than 2 can be understood as that the relay station in the set directly establishes connections with not less than 2 other relay stations. Meanwhile, in the present embodiment, every relay station in the relay station set with not less than 2 optical cables is sequentially set as a starting site, and the relay stations in the site list are traversed from the starting site according to the preset coverage range, thus determining a set of uncovered relay stations corresponding to every starting site. In the present embodiment, a portion of the relay stations located at the edges can be eliminated, so as to reduce the objects to be traversed, thus improving the efficiency of site selection.

Step 12: traversing a set of uncovered relay stations corresponding to each of the starting sites according to a preset intersection cardinality to get an intersection set, and determining one or more relay stations corresponding to a set whose intersection result is an empty set as a target monitoring station.

The intersection cardinality is a number of sets at each time of intersection, which can be 1 or 2 or other numbers. In actual scenes, a reasonable intersection cardinality can be determined according to the situation of actual network distribution.

Figure 3:
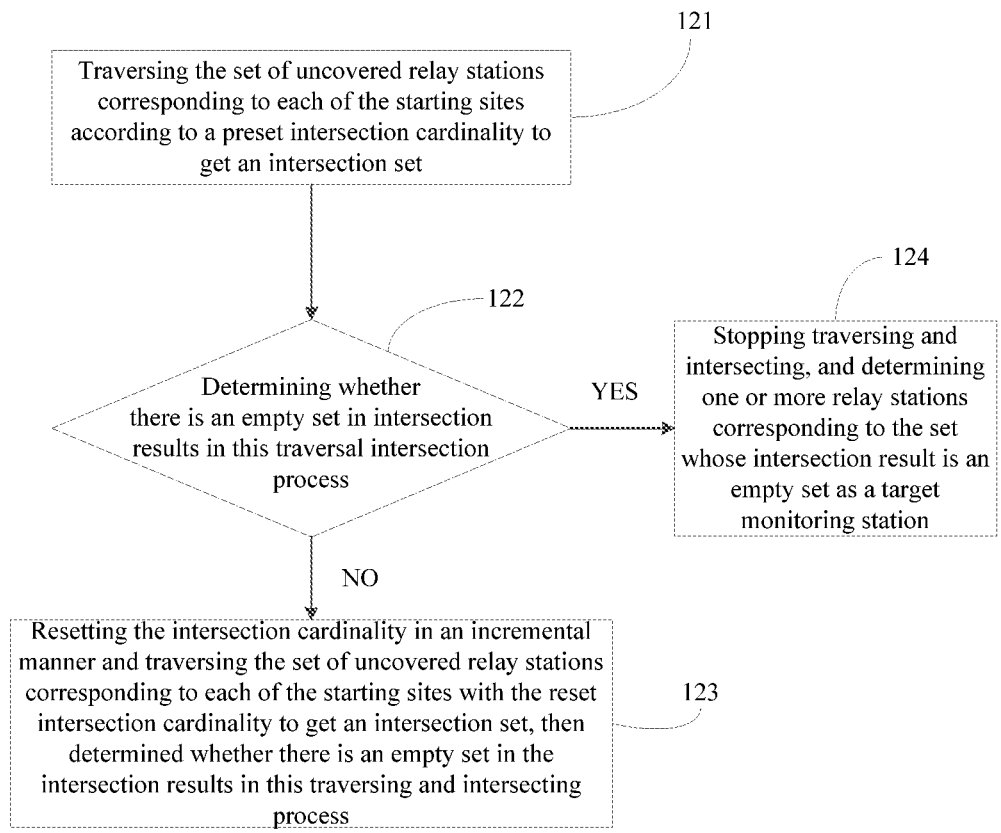
FIG. 3 is a flow schematic diagram of a specific embodiment of Step 12 in FIG. 1.

The specific method, with reference to FIG. 3, comprises following steps:

Step 121: traversing a set of remaining uncovered relay stations corresponding to each of the starting sites according to a preset intersection cardinality to get an intersection set.

In the present embodiment, a set of uncovered relay stations corresponding to each of the starting sites is traversed according to a preset intersection cardinality to get an intersection set.

Step 122: determining whether there is an empty set in intersection results in this traversing and intersecting process.

In the present embodiment, it is determined whether there is an empty set in intersection results in this traversing and intersecting process. If there is no empty set, Step 123 is executed, and if there is an empty set, Step 124 is executed.

Step 123: if there is no empty set, resetting the intersection cardinality in an incremental manner, and traversing a set of remaining uncovered relay stations corresponding to each of the starting sites according to the reset intersection cardinality to get an intersection set, then determining whether there is an empty set in intersection results in this traversing and intersecting process.

Step 124: if there is an empty set, stopping the traversing and intersecting process, and determining one or more relay stations corresponding to the set whose intersection result is an empty set as a target monitoring station.

In the present embodiment, if there is no set that can cover all the relay stations in this traversing and intersecting process, then the intersection cardinality is reset in an incremental manner, for example, it can be incremented by a difference 1, or it can be incremented by a difference 2, which depends on the actual situation, and which is not specifically limited here. At the same time, a next traversing and intersecting process is performed on a set of uncovered relay stations corresponding to each starting site according to the reset intersection cardinality, and it is determined whether there is an empty set in intersection results in said next traversing and intersecting process.

According to the above method, the traversing and intersecting process is continuously performed based on the intersection cardinality until an empty set exists in the intersection results. In one of embodiments, in order to improve the efficiency, if there is an empty set during a certain traversing and intersecting process, the traversing and intersecting process is stopped, and one or more relay stations corresponding to the set whose intersection result is an empty set are determined as a target monitoring station. In another embodiment, if there are plurality of groups of sets after intersections are empty (that is to say, there are plurality of optional monitoring stations to be combined), a monitoring station may be provided near an important relay station to reduce maintenance time when a failure occurs since different relay stations have different degree of importance in an actual scene.

Therefore, after resetting the intersection cardinality, the execution of each time of traversing and intersecting process is completed, i.e. the traverse and intersection has been performed on all of the sets, and the plurality of groups of sets that meet the intersection results being empty are acquired, thus a plurality of groups of optional combinations of monitoring stations are determined, and then one or more groups of monitoring stations are selected from the plurality of groups of combinations of monitoring stations. Specifically, the level of a relay station is acquired from the site list, wherein the higher the level of a certain relay station is, the more important the relay station is; and shortest path length between the plurality of groups of monitoring stations and high-level relay stations is obtained respectively, and the shortest path length from different monitoring stations to the high-level monitoring stations is compared, and then the monitoring station with the shortest path length is set as the target monitoring station.

In a specific application scene, the cost is high when multiple relay stations are required to simultaneously cooperate to form a monitoring station, and there may be one of the relay stations that can cover all the relay stations in the station list. Therefore, in order to improve the efficiency of site selection, before performing the traversing and intersecting process, the intersection cardinality is preset as 1, i.e. the sets themselves intersect and then whether there is a relay station that can cover all relay stations in the site list is determined. Specifically, the intersection cardinality is preset as 1, and then a set of uncovered relay stations corresponding to each starting site themselves are sequentially performed the intersecting process, and it is determined whether there is an empty set in a set of uncovered relay stations corresponding to the starting site; if there is an empty set, a relay station corresponding to the set, being an empty set, of uncovered relay stations which corresponds to the starting site is determined as a target monitoring station.

Figure 4A:
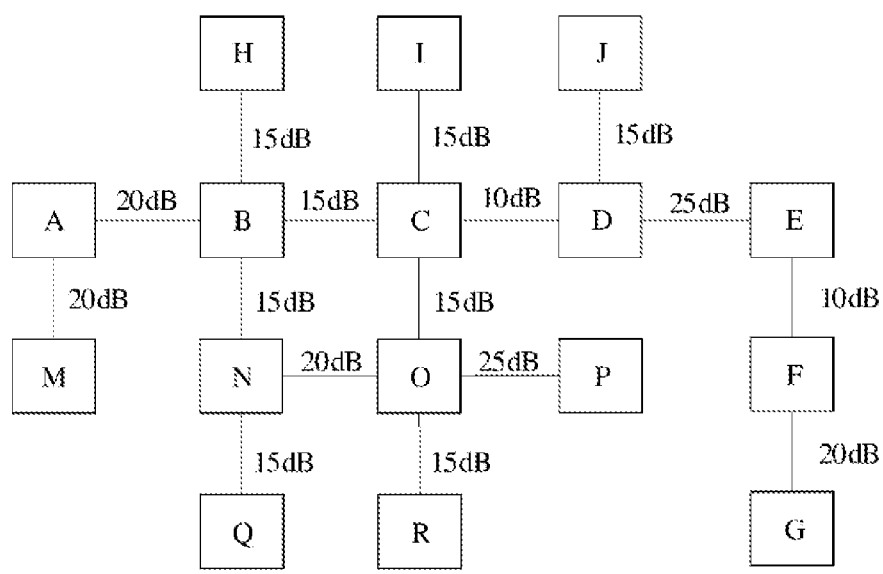
FIG. 4a is a schematic diagram of an optical fiber network topology according to an embodiment of the present disclosure.

The foregoing description specifically explained the method of site selection for a monitoring station of the present disclosure, and in order to intuitively explain the specific process of site selection for a monitoring station, a specific application scene is explained here. FIG. 4a shows a schematic diagram of an optical fiber network topology according to an embodiment of the present disclosure. As shown in FIG. 4a, the optical fiber network includes 16 different relay stations, which are a relay station A, a relay station B, a relay station C, a relay station D, a relay station E, a relay station F, a relay station G, a relay station H, a relay station I, a relay station J, a relay station M, a relay station N, a relay station O, a relay station P, a relay station Q and a relay station R, respectively.

When performing site selection for a monitoring station, a site list comprising a plurality of relay stations and connection relationships of optical cables between the relay stations can be acquired according to the schematic diagram of an optical fiber network topology. FIG. 4b shows the specific site list, the connection relationships of optical cables between the relay stations, and optical cable attenuation between the relay stations.

Now the process of the site selection for a monitoring station is explained based on FIG. 4a and FIG. 4b.

Firstly, a number of optical cables of each relay station is acquired, wherein the numbers of optical cables of relay station A, relay station E, and relay station F respectively are 2; the numbers of optical cables of relay station B, relay station C and relay station O respectively are 4; the numbers of optical cables of relay station N and relay station D respectively are 3; the numbers of optical cables of relay station G, relay station H, relay station I, relay station J, relay station M, relay station P, relay station Q, and relay station R respectively are 1, thus, a set of relay stations U1 with the number of optical cables being not less than 2 is acquired={relay station A, relay station B, relay station C, relay station D, relay station E, relay station F, relay station N, relay station O}.

Then, each relay station in the relay station set U1 with the number of optical cables being not smaller than 2 is sequentially set as a starting site, and the relay stations in the site list are traversed from the starting sites according to the preset coverage range, thereby determining a set of uncovered relay station corresponding to each starting site. Here, the preset coverage range is 40 dB taken as an example for explanation, wherein the optical fiber attenuation between the relay stations represents the path length between the relay stations.

Figures 4C, 5:
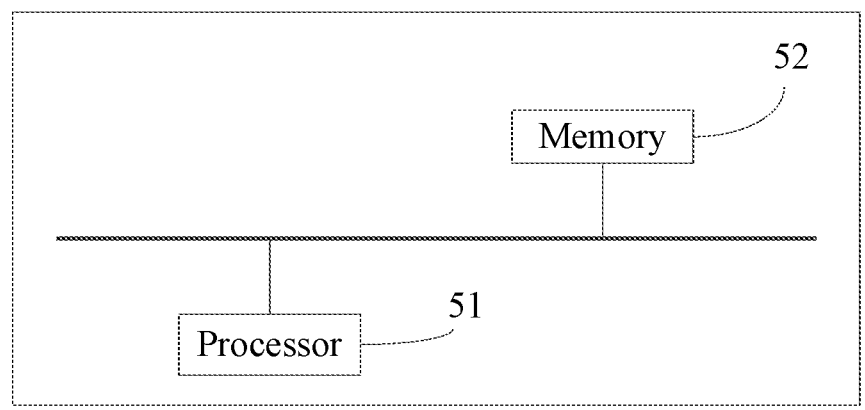
FIG. 4c is a schematic diagram of the shortest path length relationships from the relay station in FIG. 4a as the starting site to other relay stations.
FIG. 5 is a schematic structural diagram of a device for a site selection for a monitoring station provided by an embodiment of the present disclosure.

The following explains in connection with FIG. 4c. FIG. 4c shows the shortest path length (minimum attenuation) to all relay stations in the site list when different relay stations are used as starting sites. As shown in FIG. 4c, all the relay stations whose shortest path length from the starting site to other relay stations are greater than 40 dB are the set of uncovered relay stations corresponding to the starting sites.

(1) Taking the relay station A as the starting site, the set $U_A$ of uncovered relay stations corresponding to the starting site A (relay station A)={relay station D, relay station E, relay station F, relay station G, relay station I, relay station J, relay station O, relay station P, relay station Q, and relay station R}.

(2) Taking the relay station B as the starting site, the set $U_B$ of uncovered relay stations corresponding to the starting site B (relay station B)={relay station E, relay station F, relay station G, relay station P, and relay station R}.

(3) Taking relay station C as the starting site, the set $U_C$ of uncovered relay stations corresponding to the starting site C (relay station C)={relay station F, relay station G, relay station M, and relay station Q}.

(4) Taking relay station D as the starting site, the set $U_D$ of uncovered relay stations corresponding to the starting site D (relay station D)={relay station A, relay station G, relay station M, relay station P, and relay station Q}.

(5) Taking relay station E as the starting site, the set $U_E$ of uncovered relay stations corresponding to the starting site E (relay station E)={relay station A, relay station B, relay station H, relay station I, relay station M, relay station N, relay station O, relay station P, relay station Q, and relay station R}.

(6) Taking relay station F as the starting site, the set $U_F$ of uncovered relay stations corresponding to the starting site F (relay station F)={ relay station H, relay station I, relay station J, relay station M, relay station N, relay station O, relay station P, relay station Q, and relay station R}.

(7) Taking relay station N as the starting site, the set $U_N$ of uncovered relay stations corresponding to the starting site N (relay station N)={relay station E, relay station F, relay station G, relay station I, relay station J, relay station M, and relay station P}.

(8) Taking relay station O as the starting site, the set $U_O$ of uncovered relay stations corresponding to the starting site O (relay station O)={relay station A, relay station E, relay station F, relay station H, and relay station M}.

After determining the set of uncovered relay stations corresponding to each of the starting sites, according to the preset intersection cardinality, all of the aforementioned sets are traversed to get intersection sets, wherein the intersection cardinality is the number of sets for each time of intersection. Here, taking the preset intersection cardinality being 1 as an example for explanation, when performing the traversing and intersecting process for the first time, if the intersection cardinality is 1, the number of sets each time is 1, which means that the sets perform an intersecting process on themselves. When the intersection cardinality is 1, $U_A$~$U_O$ respectively perform the intersecting process on themselves, and in the traversing and intersecting process for the first time, if there is no empty set in the intersection results, then the intersection cardinality is incremented.

Here, if it is incremented by the difference 1, then when performing the traversing and intersecting process for the second time, the traversing and intersecting process is performed according to the intersection cardinality as 2. Set $U_A$, set $U_B$, set $U_C$, set $U_D$, set $U_E$, set $U_F$, set $U_N$, and set $U_O$ are respectively intersected with other sets, for example, set $U_A$ is respectively intersected with set $U_B$, set $U_C$, set $U_D$, set $U_E$, set $U_F$, set $U_N$ and set $U_O$; set $U_B$ is respectively intersected with set $U_A$, set $U_C$, set $U_D$, set $U_E$, set $U_F$, set $U_N$ and set $U_O$. The traversing and intersecting process is performed according to the aforementioned manner, and If there is no empty set in every intersection result, the intersection cardinality is increased again.

Here, it is incremented by the difference 1, and when performing the traversing and intersecting process for the third time, the traversing and intersecting process is performed according to the intersection cardinality as 3. Any three different sets in set $U_A$, set $U_B$, set $U_C$, set $U_D$, set $U_E$, set $U_F$, set $U_N$, and set $U_O$ are traversed to get an intersection set, for example, the intersection is performed on set $U_A$, set $U_B$ and set $U_C$; and the intersection is performed on set $U_D$, set $U_E$ and set $U_F$, and the traversing and intersecting process is performed according to the aforementioned manner. When the intersection is performed on set $U_B$, set $U_E$, and set $U_O$, if the intersection result is empty, then the traversing and intersecting process is stopped, and a plurality of relay stations corresponding to set $U_B$, set $U_E$, and set $U_O$ as target monitoring stations, i.e. the relay station B, the relay station E, and the relay station O are set as target monitoring stations.

Figure 2:
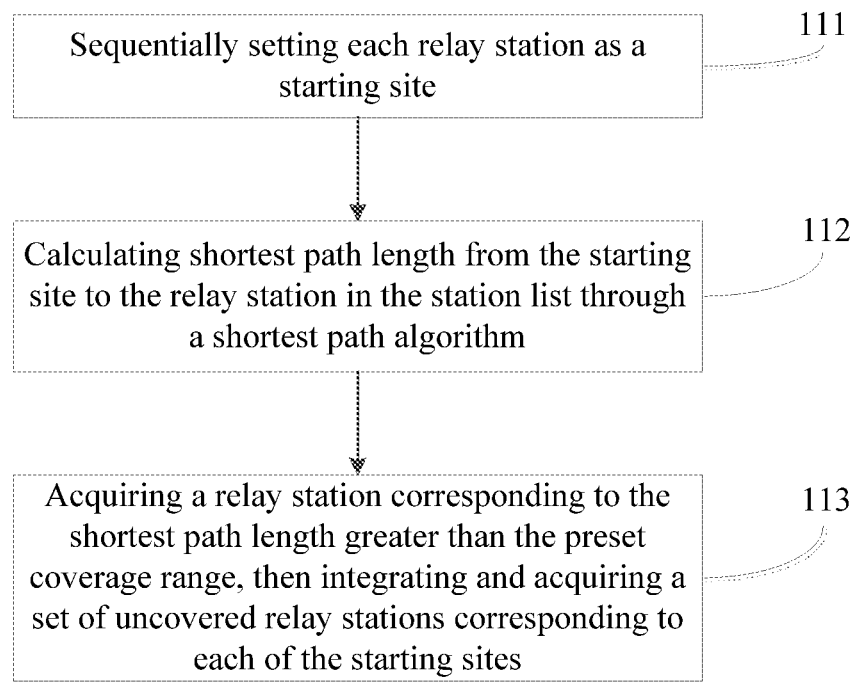
FIG. 2 is a flow schematic diagram of a specific embodiment of Step 11 in FIG. 1.

It should be noted here that the aforementioned embodiments are to facilitate a better explanation and description of the present disclosure, and they are only one implementation of the aforementioned method of site selection for a monitoring station and the specific location method should refer to FIG. 1 to FIG. 3 and related text descriptions.

Compared with the prior arts, the embodiments of the present disclosure have following advantages: the present disclosure adopts a traversal manner to determine a set of uncovered relay stations corresponding to each relay station, and the aforementioned sets is sequentially traversed to get an intersection set; when an empty set exists in the intersection results, it can be determined that there is no same relay station in the aforementioned one or more sets, thus it can be determined that the mutual cooperation of the relay stations corresponding to the set whose intersection result as mentioned above is an empty set can cover all relay stations in the site list, then the relay stations corresponding to the set whose intersection result is an empty set can be set as an target monitoring station, which improves the efficiency and accuracy of site selection for a monitoring station and has wide applicability, such that the optical cable monitoring system can easily monitor all of the relay stations in the site list, shortening the failure duration of the fiber optic cables, improving the maintenance efficiency of the transmission network, and meanwhile, reducing the line maintenance cost.

Embodiment 2

Now refer to FIG. 5 which is a schematic structural diagram of a device for site selection for a monitoring station provided by an embodiment of the present disclosure. The device for site selection for a monitoring station in the present embodiment includes one or more processors 51 and a memory 52, wherein one processor 51 is taken as an example in FIG. 5.

The processor 51 and the memory 52 may be connected by a bus or other means, wherein the connection by bus is taken as an example in FIG. 5.

The memory 52 is used as a non-volatile computer-readable storage medium based on the method of site selection for a monitoring station, which can be used to store non-volatile software programs, non-volatile computer-executable programs and modules, such as the method of site selection for a monitoring station and corresponding program instructions in the Embodiment 1. The processor 51 executes various functional applications and data processing of the method of site selection for a monitoring station by running non-volatile software programs, instructions and modules stored in the memory 52, i.e. implementing the function of the method of site selection for a monitoring station of the Embodiment 1.

The memory 52 may include a high-speed random access memory, and may also include a non-volatile memory, such as at least one magnetic disk storage device, a flash memory device, or other non-volatile solid state memory devices. In some embodiments, the memory 52 may optionally include memory remotely provided relative to the processor 51, and these remote memories may be connected to the processor 51 through a network. Examples of the aforementioned network include, but are not limited to, the Internet, an enterprise intranet, a local range network, a mobile communication network, and combinations thereof.

In the present embodiment, when performing the site selection for a monitoring station, it is firstly necessary to acquire an actual optical cable distribution map, and then to select a suitable relay station as the monitoring station according to the optical cable distribution map. In a specific application scene, when building a communication network for a certain range or place, the actual optical cable network structure is integrated into a network topological diagram or chart as a data source. In the present embodiment, the processor 51 may acquire a site list comprising a plurality of relay stations and a connection relationship of optical cables between the relay stations by analyzing the aforementioned data source.

Specifically, it is necessary for the processor 51 to acquire a site list comprising a plurality of relay stations in a certain range or a certain place and a connection relationship of optical cables between the relay stations, wherein in the same optical cable distribution map, the site name of every relay station in the site list is unique, so as to identify and distinguish different relay stations. At the same time, the processor 51 acquires the connection relationship of optical cables between different relay stations and the attenuation between different relay stations. In an actual scene, the attenuation of an optical cable has a certain relationship with the actual path length of the optical cable, and the attenuation of the optical cable can be used to indirectly reflect the actual path length of the optical cable.

Then, the processor 51 sequentially sets each relay station as a starting site, and traverses the relay stations in the site list according to a preset coverage range starting from the starting site, determining a set of uncovered relay stations corresponding to each starting site.

The preset coverage range is determined by a test dynamic range of a corresponding optical cable tester, i.e. it is determined by the maximum test capability of a tester. In an actual application scene, an OTDR can be used to measure an optical cable between relay stations, in order to locate failures. The OTDR is a precise photoelectric integrated instrument using Rayleigh scattering and backscattering generated by Fresnel reflection when light is transmitted in an optical fiber, and is widely used in the maintenance and construction of an optical cable line, and can measure the length of an optical fiber, transmission attenuation of an optical fiber, joint attenuation and failure location and the like.

In the present embodiment, the processor 51 sets the preset coverage range according to the dynamic range of the OTDR. The dynamic range of the OTDR is the maximum attenuation value of the backscattering curve which can be tested by the OTDR. At present, a range of the maximum attenuation value of the OTDR on the market is 30~45 dB, i.e. the dynamic range of the OTDR is between 30 dB and 45 dB, can be 30 dB or 40 dB or 45 dB. The greater the dynamic range of the OTDR is, the higher the corresponding cost of the OTDR tester is. In an actual application scene, the corresponding OTDR can be selected according to the actual situation, and then the coverage range is set.

In this embodiment, the processor 51 sequentially sets each relay station in the site list as a starting site, traverses the relay stations in the site list starting from the starting site according to a preset coverage range, and determines a set of uncovered relay stations corresponding to each starting site. Different connection paths may exist between different relay stations when the optical fiber network is relatively complex, and the optical cable attenuation of different connection paths is different. In order to improve the accuracy of the determination, in the present embodiment, the processor 51 uses a shortest path algorithm to calculate the shortest path length between different relay stations, and compares the shortest path length with the preset coverage range, thus determining a set of uncovered relay stations corresponding to each starting site. The shortest path algorithm includes any one of Dijkstra algorithm, Bellman-Ford algorithm, Floyd algorithm and SPFA algorithm, and the corresponding algorithm can be selected according to the actual optical cable distribution map.

Since the preset coverage range is determined by the tester, when the shortest path from the starting site to the certain relay station is greater than the preset coverage range, the tester starting from the starting site cannot cover the relay station, i.e. the tester cannot completely test all the optical cables between the starting site and the relay station, and thus cannot determine a fault point. Therefore, when the shortest path length between the starting site and other relay stations is greater than the preset coverage range, the starting site cannot cover the corresponding relay station, and the relay station corresponding to the shortest path length being greater than the preset coverage range are integrated, thereby acquiring a set of uncovered relay stations corresponding to each starting site.

Specifically, when the OTDR is selected for testing, the preset coverage range is the dynamic range of the OTDR, and a relay station corresponding to the shortest path length being greater than the dynamic range of the OTDR is acquired, thereby integrating and acquiring a set of uncovered relay stations corresponding to each of the starting sites.

In a preferred embodiment, in order to improve the efficiency of site selection and save the ability of processing and calculation, a set of relay stations with the optical cable directions being not less than 2 can be firstly screened out, and then a traversing and intersecting process is performed on the set of relay stations with the optical cable directions being not less than 2 to determine a set of uncovered relay stations corresponding to each starting site.

Specifically, the processor 51 acquires a number of optical cables of each relay station, wherein the number of optical cables is the number of optical cables directly established connections between a relay station and other relay stations in the station list, and a set of relay stations with the number of optical cables being not less than 2 is acquired, which can be understood as that a relay station in the set establishes connections with other not less than 2 relay stations. Meanwhile, in the present embodiment, the processor 51 sequentially sets each relay station in the relay station set with the number of optical cables being not less than 2 as a starting site, and the relay stations in the site list are traversed from the starting site according to the preset coverage range, then a set of uncovered relay stations corresponding to each starting site is determined. In the present embodiment, a portion of the relay stations located at the edge can be eliminated, so as to reduce the objects to be traversed, thus improving the efficiency of site selection.

In the present embodiment, according to a preset intersection cardinality, the processor 51 traverses a set of uncovered relay stations corresponding to each of the starting sites to get an intersection set, and determines one or more relay stations corresponding to a set whose intersection result is an empty set as a target monitoring station.

The intersection cardinality is the number of sets in each time of intersection, which can be 1 or 2 or other numbers. In actual scenes, a reasonable intersection cardinality can be determined according to the actual network distribution.

Specifically, the processor 51 traverses a set of uncovered relay stations corresponding to each of the starting sites according to a preset intersection cardinality to get an intersection set, and determines whether there is an empty set in the intersection results during this traversing and intersecting process. If there is no empty set, then there is no set that can cover all the relay stations in this traversing and intersecting process, and then the intersection cardinality is reset in an incremental manner, for example, it can be incremented by a difference 1, or a difference 2, which depends on the actual situation and is not specifically limited here. At the same time, a next traversing and intersecting process is performed on a set of uncovered relay stations corresponding to each starting site according to the reset intersection cardinality, and it is determined whether there is an empty set in the intersection results in this traversing and intersecting process.

According to the above method, the traversing and intersecting process is continuously performed based on the intersection cardinality until an empty set exists in the intersection results. In one of the embodiments, in order to improve the efficiency, if there is an empty set during a certain traversing and intersecting process, the traversing and intersecting process is stopped, and one or more relay stations corresponding to the set whose intersection result is an empty set are determined as a target monitoring station. In another embodiment, during a certain traversing and intersecting process, there may be cases where the intersection results of a plurality of groups of sets after intersecting are all empty, i.e. it can be combined by a plurality of groups of optional monitoring stations, and in an actual scene, different relay stations have different degrees of importance, therefore, a monitoring station can be set up close to an important relay station, so as to reduce maintenance time when a fault occurs.

Therefore, after resetting the intersection cardinality, the execution of each time of traversal intersection process is completed, i.e. all of the sets are traversed to get intersection sets, and the plurality of groups of sets that meet the condition of the intersection result being empty are acquired, thereby determining many groups of optional combinations of monitoring stations, and then selecting one or more groups of monitoring stations from the combinations of many groups of monitoring stations. Specifically, the level of the relay station is acquired from the site list, wherein the higher the level of a certain relay station is, the more important the relay station is; and the processor 51 respectively acquires the shortest path length between many groups of monitoring stations and the high-level relay stations, and compares the shortest path length from different monitoring stations to the high-level monitoring stations, and then the monitoring station with the shortest path length is set as the target monitoring station.

In a specific application scene, the cost is high when multiple relay stations are required to simultaneously cooperate to form a monitoring station, and it is possible that one of the relay stations may cover all the relay stations in the station list, therefore, in order to improve the efficiency of site selection, before performing the traversing and intersecting process, the intersection cardinality is preset as 1, i.e. the sets is performed the intersecting process on themselves and then whether there is a relay station that can cover all relay stations in the site list is determined. Specifically, the intersection cardinality is preset as 1, and the processor 51 sequentially performs the intersecting process on a set of uncovered relay stations corresponding to each starting site themselves, and judges and determines whether there is an empty set in the set of uncovered relay stations corresponding to the starting site. if there is an empty set, the processor 51 determines a relay station corresponding to a set, being an empty set, of uncovered relay stations corresponding to the starting site as a target monitoring station.

The device of site selection for a monitoring station in the present embodiment is applicable to the site selection method of any of the aforementioned embodiments, and the specific process of the method of site selection for a monitoring station can refer to FIG. 1 to FIG. 4 and related text descriptions, here, the description is not repeated.

Compared with the prior arts, the embodiments of the present disclosure have following advantages: the present disclosure adopts a traversal manner to determine a set of uncovered relay stations corresponding to each relay station, and sequentially traverses the aforementioned sets to get an intersection set; when an empty set exists in the intersection results, it can be determined that there is no same relay station in the aforementioned one or more sets, thus it can be determined that the mutual cooperation of the relay stations corresponding to the sets whose intersection results as mentioned above are empty sets can cover all relay stations in the site list, then the relay stations corresponding to the set whose intersection result is an empty set can be set as an target monitoring station, which improves the efficiency and accuracy of site selection for a monitoring station and has wide applicability, in order to monitor all of the relay stations in the site list by the optical cable monitoring system, shorten the time span of failure of the fiber optic cable, improve the maintenance efficiency of the transmission network, and meanwhile, reduce the line maintenance cost.

It is noted that the information interaction and executing process between modules and units in the above apparatus and systems are based on the same concept as the embodiments of the method according to the present disclosure. the detailed description can refer to the embodiments of the method and it would not be repeated here.

The ordinary skill in the art can understand that all or a portion of the steps in the various methods of the embodiments can be completed by a program to instruct relevant hardware, and the program can be stored in a computer readable storage medium which may include: Read Only Memory (ROM), Random Access Memory (RAM), magnetic disk or optical disk, etc.

The above description is only the preferred embodiments of the present disclosure and is not intended to limit the present disclosure. Any modification, equivalent replacement, and improvement made within the spirit and principle of the present disclosure shall be included in the protection of the present disclosure.

What is claimed is:

1. A method of site selection for a monitoring station characterized in comprising:
    acquiring a site list comprising a plurality of relay stations and connection relationships of optical cables between the relay stations;
    sequentially setting each relay station as a starting site, and traversing the relay stations in the site list according to a preset coverage range starting from the starting site, then determining a set of uncovered relay stations corresponding to each of the starting sites;
    traversing the set of uncovered relay stations corresponding to each of the starting sites according to a preset intersection cardinality to get an intersection set, and determining one or more relay stations corresponding to a set whose intersection result is an empty set as a target monitoring station.

2. The method of site selection for a monitoring station of claim 1, characterized in that after the acquiring a site list comprising a plurality of relay stations and a connection relationship of optical cables between relay stations, further comprising:
    acquiring a number of optical cables of each relay station, wherein the number of optical cables is a number of optical cables directly established connections between one of the relay station and other relay stations in the station list;
    acquiring a set of relay stations with the number of optical cables being not less than 2;
    the sequentially setting each relay station as a starting site, and traversing the relay stations in the site list according to a preset coverage range starting from the starting site, then determining a set of uncovered relay stations corresponding to each of the starting sites comprises:
    sequentially setting each relay station in the relay station set with the number of optical cables being not less than 2 as a starting site, and traversing the relay station in the site list starting from the starting site according to a preset coverage range, then determining a set of uncovered relay station corresponding to each starting site.

3. The method of site selection for a monitoring station of claim 1, characterized in that the sequentially setting each relay station as a starting site, and traversing relay stations in the site list according to a preset coverage range starting from the starting site, then determining a set of uncovered relay stations corresponding to each of the starting sites comprises:
    sequentially setting each relay station as a starting site;
    calculating shortest path length from the starting site to the relay station in the station list through a shortest path algorithm;
    acquiring a relay station corresponding to the shortest path length being greater than the preset coverage range, then integrating and acquiring a set of uncovered relay stations corresponding to each of the starting sites.

4. The method of site selection for a monitoring station of claim 3, characterized in that the preset coverage range is a dynamic range of an optical time domain reflectometer OTDR;
    optical fiber attenuation between the relay stations represents the path length between the relay stations;
    the acquiring a relay station corresponding to the shortest path length being greater than the preset coverage range, then integrating and acquiring a set of uncovered relay stations corresponding to each of the starting sites comprises:
    acquiring a relay station corresponding to the shortest path length being greater than the dynamic range of the OTDR, then integrating and acquiring a set of uncovered relay stations corresponding to each of the starting sites.

5. The method of site selection for a monitoring station of claim 4, characterized in that the shortest path algorithm comprises any one of Dijkstra algorithm, Bellman-Ford algorithm, Floyd algorithm and SPFA algorithm.

6. The method of site selection for a monitoring station of claim 4, characterized in that the dynamic range of the OTDR is a maximum attenuation value of a backscattering curve which can be tested by the OTDR, and a range of the maximum attenuation value is 30 45 dB.

7. The method of site selection for a monitoring station of claim 1, characterized in that the intersection cardinality is a number of sets in each time of intersection;
    the traversing the set of uncovered relay stations corresponding to each of the starting sites according to a preset intersection cardinality to get an intersection set, and determining one or more relay stations corresponding to a set whose intersection result is an empty set as a target monitoring station comprises:
    traversing the set of uncovered relay stations corresponding to each of the starting sites according to a preset intersection cardinality to get an intersection;
    determining whether there is an empty set in intersection results in this traversing and intersecting process;
    if there is no empty set, resetting the intersection cardinality in an incremental manner and traversing the set of uncovered relay stations corresponding to each of the starting sites with the reset intersection cardinality to get an intersection, then determined whether there is an empty set in intersection results in this traversing and intersecting process.

8. The method of site selection for a monitoring station of claim 7, characterized in that method of site selection further comprises if there is an empty set, stopping traversing and intersecting, and determining one or more relay stations corresponding to the set whose intersection result is an empty set as a target monitoring station.

9. The method of site selection for a monitoring station of claim 7, characterized in that the intersection cardinality is 1, the traversing the set of uncovered relay stations corresponding to each of the starting sites according to a preset intersection cardinality to get an intersection, and determining one or more relay stations corresponding to a set whose intersection result is an empty set as a target monitoring station comprises:

sequentially intersecting the set of relay stations themselves that cannot be covered corresponding to each starting site;

determining whether there is an empty set in the set of uncovered relay stations corresponding to the starting site;

if there is an empty set, determining a relay station corresponding to a set of which a set of uncovered relay stations corresponding to the starting site is an empty set as a target monitoring station.

10. A device for site selection for a monitoring station characterized in comprising:

at least one processor; and, a memory communicatively connected with the at least one processor, wherein the memory stores instructions that can be executed by the at least one processor, and the instructions are set by a program to execute the method of site selection for a monitoring station, wherein the method comprises:

acquiring a site list comprising a plurality of relay stations and connection relationships of optical cables between the relay stations;

sequentially setting each relay station as a starting site, and traversing the relay stations in the site list according to a preset coverage range starting from the starting site, then determining a set of uncovered relay stations corresponding to each of the starting sites;

traversing the set of uncovered relay stations corresponding to each of the starting sites according to a preset intersection cardinality to get an intersection set, and determining one or more relay stations corresponding to a set whose intersection result is an empty set as a target monitoring station.

* * * * *